United States Patent [19]

Warner, Jr.

[11] 3,923,681
[45] Dec. 2, 1975

[54] IMIDAZOLE-THIO SEMI-CARBAZONE SUNSCREEN AGENTS

[75] Inventor: Paul L. Warner, Jr., Clarence, N.Y.

[73] Assignee: Westwood Pharmaceuticals, Inc., Buffalo, N.Y.

[22] Filed: Apr. 22, 1974

[21] Appl. No.: 462,684

[52] U.S. Cl. ............ 252/300; 260/240 G; 260/309; 424/59
[51] Int. Cl.² .............. C07D 233/84; G02B 5/23; A61K 7/42
[58] Field of Search .......... 260/240 G, 309; 424/59; 252/300

[56] References Cited
UNITED STATES PATENTS

| | | | |
|---|---|---|---|
| 3,096,338 | 7/1963 | Dehnert | 260/309 X |
| 3,375,271 | 3/1968 | Catino et al. | 424/59 X |
| 3,419,659 | 12/1968 | Catino et al. | 424/60 |
| 3,646,016 | 2/1972 | Henry et al. | 260/240 G |

OTHER PUBLICATIONS
Osborne et al., "Protective Barriers for the Sun" in J. Society Consumer Chemists, 6/1961 pp. 271–279.

Primary Examiner—Allen B. Curtis
Attorney, Agent, or Firm—James Magee, Jr.

[57] ABSTRACT

The specification discloses compositions and methods for protecting light-sensitive subjects, including human skin, from adverse effects of ultraviolet radiation by means of a sunscreen having the structure:

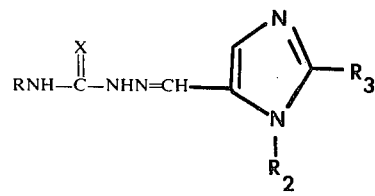

wherein X is sulfur or oxygen, R is hydrogen, lower alkyl, alkenyl, phenyl, or substituted phenyl and $R_2$ and $R_3$ are each a lower alkyl group.

8 Claims, No Drawings

IMIDAZOLE-THIOSEMI-CARBAZONE SUNSCREEN AGENTS

The Invention

This invention relates to compositions for use in filtering ultraviolet radiation to screen out rays that are harmful to mammalian (human or animal) skin or organic materials, thereby protecting against the burning and degrading effects of such radiation.

It is known that electromagnetic radiation emanating from the sun or from a source of ultraviolet light can have a detrimental and deleterious effect on paints, plastics, and other substances. It is also known that such radiation is harmful and damaging to human skin since radiation in this range of wavelength causes cutaneous sunburn and has been identified as carcinogenic. It is also acknowledged that certain radiation can directly or indirectly cause an adverse effect or response to the skin and various organs, particularly in connection with the influence of other agents, such as coal tar extracts and various plant extracts. More particularly, the influence of sunlight or ultraviolet radiation in connection with the use of drugs can result in adverse effects such as edema, hyperpigmentation, vesicle formation, and exaggerated sunburn. Other skin disorders such as polymorphic light eruptions and erythematosis are significantly exaggerated by exposure to light in this wavelength range.

Electromagnetic radiation within the ultraviolet and visible spectrum incident upon an object can be blocked by a mechanical barrier, for example, by a film of titanium dioxide, or the like, which prevents passage of all radiation regardless of wavelength. Another method which permits the greater part of the incident radiation to pass through and which takes out only a specified spectral range depends upon the employment of a selective sunscreen agent. A sunscreen agent is a substance which interacts photochemically with radiation of a given wavelength and removes all or part of the radiation. Thus, important criteria for evaluation of sunscreen agents are: 1) the ability to absorb light, i.e., to display an ultraviolet or visible light-absorption spectrum and 2) to absorb the light efficiently, that is to have a molar absorptivity or extinction coefficient which is sufficiently high to provide effective sunscreening at relatively low concentrations. In general, an extinction coefficient or molar absorptivity of at least 20,000 is desirable.

In connection with the human skin, pigmentation or tanning is generally produced by radiation of the ultraviolet range roughly from about 2,900 to about 4,000 A. Radiation in the wavelength range of about 2,950 A. to 3,150 A. is sufficiently potent to produce severe erythema within a few hours. This range is often referred to as the burning range. At wavelengths above the burning range, e.g., from about 3,300 to 3,900, the radiation produces direct tanning after exposure of sufficient duration and intensity. Hence, it is desirable to screen out the burning rays of the sun without significant reduction in the tanning rays.

Other effects of ultraviolet radiation are of significant importance with respect to commercial products and the photochemical decomposition thereof. Many materials are either unstable when subject to such radiation or are effected to the extent that they become undesirable. Plastic materials, paints, and pigments when exposed to radiation undergo substantial decomposition resulting in the development of undesirable colors, odors, loss of transparency, and the like. Accordingly, prolonged exposure of such materials to ultraviolet radiation is a matter of significant importance. It is also an object of the invention to provide methods for the protection of light-sensitive subjects from the photodecomposition and deleterious effects caused by exposure to significant quantities of ultraviolet radiation. A further object of the invention is to provide compositions which can be applied topically to human skin and which are useful as sunscreens and tanning agents. Another object of the invention is to provide compounds and compositions which can be admixed with or incorporated into or applied to the surface of light-sensitive materials for the purpose of screening or filtering ultraviolet radiation. Another object of the invention is to provide cosmetically acceptable formulations of sunscreen agents which are substantially non-staining when exposed to sunlight.

The sunscreens of this invention have been found to be effective in preventing sunburn while facilitating tanning.

These and other objects of the invention are achieved by providing and using as sunscreen agents compounds having the following formula:

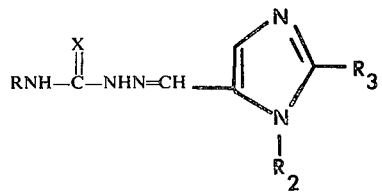

wherein R can be hydrogen, lower alkyl, alkenyl, phenyl, or substituted phenyl; $R_2$ and $R_3$ can be the same or different lower alkyl groups; and X is sulfur or oxygen.

As used herein, the term lower alkyl refers to alkyl groups having from 1 to 5 carbon atoms. A preferred group of compounds in the abovedescribed class are those in which X is sulfur; $R_2$ and $R_3$ are methyl; and R is selected from the group consisting of hydrogen, methyl, ethyl, allyl, and phenyl.

Illustrative thiosemicarbazones include 1,2-dimethyl-5-imidazolecarboxaldehyde thiosemicarbazone; 1,2-dimethyl-5-imidazolecarboxaldehyde (4'-methyl-3'-thio)semicarbazone; 1,2-dimethyl-5-imidazolecarboxaldehyde (4'-ethyl-3'-thio)semicarbazone; 1,2-dimethyl-5-imidazolecarboxaldehyde (4'-allyl-3'-thio)semicarbazone; and 1,2-dimethyl-5-imidazolecarboxaldehyde (4'-phenyl-3'-thio)semicarbazone. The compounds of this invention can be formulated into well-known cosmetically and dermatologically acceptable formulations.

Illustrative semicarbazones include 1,2-dimethylimidazole-5-carboxaldehyde semicarbazone and 1,2-dimethylimidazole-5-carboxaldehyde (4'-phenyl) carbazone and the like.

In general, the formulation itself does not affect the actual radiation-absorbing ability of the sunscreen agent but merely facilitates application and use thereof, e.g., by maintenance of an effective film of the sunscreen on the surface to be protected. As indicated above, the compounds of this invention are particularly useful as sunscreen agents in pharmaceutical compositions. Accordingly, the invention includes pharmaceutical compositions which contain the sunscreen agent in a minor amount. Such compositions comprise, as a major portion thereof, a pharmaceutically acceptable carrier and the sunscreen agent in an amount effectively screening the burning rays of the sun. Generally, the sunscreen agent is employed in the pharmaceutical composition in an amount of from about 0.01 to about 5% by weight based on the total weight of the composition. In accordance with this invention, any suitable carrier or vehicle conventionally employed for suntan lotions or cosmetic creams, and the like, can be utilized. The particular vehicle or carrier employed is not an essential feature of the present invention and merely facilitates application to the skin.

The compositions are applied to the skin in a known and conventional manner normally just prior to exposure to the sun.

The optimum proportion or concentration of the sunscreen agent in the composition will depend, at least in part, on the nature of the coating or film which is formed and left on the skin since some types of formulation will permit the formation of a screen of greater concentration of screening agent per unit area than others depending, for example, on viscosity and spreading power of the formulation and the permanence thereof in terms of resistance to wash off by perspiration or bathing.

The sunscreening compositions of this invention are not confined to any particular classes of cosmetics or to any particular formulations. Nevertheless, it is preferred to employ the compounds of this invention along with a substantially greater amount of a dermatologically acceptable vehicle compatible with the skin, such as corn oil, aqueous ethanol, isopropanol, sesame oil, propylene glycol, benzyl alcohol, oleyl alcohol, isopropyl esters of fatty acids, such as myristic and palmitic acids, or a mineral oil or wax. The vehicle should be of such a viscosity and/or wetting power that the composition may be satisfactorily applied to the skin as a continuous film or coating, despite the natural oiliness thereof.

Dilute compositions of this type are simple mixtures, dispersions or solutions, and are prepared by simple mixing, solution or dispersion of the ingredients. The sunscreen can be combined therewith in any convenient order. Where the sunscreen is soluble in the suspending medium, it will be dissolved therein at any stage in the preparation, generally before the insoluble or suspended ingredients are added. Where the sunscreen is insoluble and therefore dispersed or suspending in the medium, it is incorporated with any other such ingredients and the emulsifier if any. Mixing in all cases is adequate to produce a homogeneous solution or dispersion.

The sunscreen lotions generally will contain a film-forming base, a solvent and the sunscreen. The creams will contain a film-forming base (preferably water insoluble), an emulsifier, a stabilizer, water and the sunscreen. A heavy lotion will contain all the liquid ingredients that are present in a cream, but in smaller proportions to increase the viscosity.

Solvents which can be used to prepare lotions in which the sunscreen is in solution include methanol, ethanol, isopropanol, n-butanol, isobutanol, primary amyl alcohol, methyl amyl alcohol, 2-ethylbutanol, 1-hexanol, 2-ethylhexanol, 2,6-dimethyl-4-heptanol, isodecanol, 2,6,8-trimethyl-4-nonanol, undecanol, tetradecanol, heptadecanol, acetone, amyl acetate, oils such as sesame oil, soya bean oil, safflower oil, acetylated lanolin alcohols (Acetulin), lanolin, ethoxylated lanolin, and polyoxethylene sorbitan esters such as the monolaurate, monostearate, and monooleate (Tween 20, 60 and 80). Film-forming bases that may be used include isopropyl myristate, propylene glycol, glycol ethers such as ethylene glycol monomethyl ether (methyl Cellosolve), ethylene glycol monobutyl ether (butyl Cellosolve), glycerin, castor oil, lauryl and oleyl alcohols, glyceryl ricinoleates, ethylene glycol and glyceryl laurates, ethylene glycol and glyceryl stearates, isopropyl stearate, butyl oleate, butyl stearate, ethyl oleate, etc.

To form cosmetic creams or heavy lotions, such solutions are emulsified with suitable oils and fats such as coconut oils, lanolin, palmitates and stearates. In the event the sunscreen is insoluble in the solvent phase, it can be emulsified therein or in the oil or fat.

1,2-Dimethyl-5-imidazolecarboxaldehyde has been reported by B. A. Tertov, V. V. Burykin, and I. D. Sudekov, Khim. Geterotsiki. Soedin., 1969, 560 (1969); Chem. Abst. 71, 124328Y (1969). 3-Thiosemicarbazide and the 4-alkyl, 4-ethyl, 4-methyl, and 4-phenyl-3-thiosemicarbazides were purchased from Aldrich Chemical Company, Milwaukee, Wisconsin. Ultraviolet spectra were taken in ethanol using a Beckman DB-G grating spectrophotometer. Melting points were obtained by the capillary tube method using a Mel-Temp melting point apparatus and are uncorrected. Elemental analysis were performed by Galbraith Laboratories, Inc., Knoxville, Tennessee.

EXAMPLE 1

1,2-Dimethyl-5-Imidazole-carboxaldehyde-3′-Thiosemicarbazone:

A solution of 20.0 gm. (0.16 mole) of 1,2-dimethyl-5-imidazolecarboxaldehyde and 14.4 g. (0.16 mole) of thiosemicarbazide in 480 ml. of a 5:1 (by volume) ethanol-water solvent system was refluxed for 18 hours. The precipitated solid was collected from the hot reaction mixture by filtration, crystallized from N,N-dimethylformamide, recrystallized from water, and air dried to give 24.7 g. (75.8%) of a fine-grained white solid, mp: 226°–227°. $\lambda$ max(nm) = 315 (Am = 39,534) Anal. Calc'd for $C_7H_{12}N_5S$:C, 42.40; H, 6.10; N, 35.32; S, 16.17. Found:C, 42.73; H, 6.04; N, 35.60.

EXAMPLE 2

1,2-Dimethyl-5-Imidazolecarboxaldehyde-(4′-Methyl-3′-Thio) Semicarbazone:

In a reaction identical to Example 1 (above), 16.8 g. (0.16 mole) of 4-methyl-3-thiosemicarbazide was condensed with 0.16 mole of the aldehyde. Following the 18 hour reflux period, the reaction mixture was chilled and the vessel was scratched to induce crystallization. The white solid was collected by filtration and dried to give 16.4 g. (48.0%) of the pure product, mp: 227°–228°. $\lambda$ max(nm) = 318 (Am = 37,260) Anal. Calc'd for $C_8H_{14}N_5S$: C, 54.26; H, 6.65; N, 32.99; S, 15.10. Found: C, 45.30; H, 6.63; N, 33.23.

EXAMPLE 3

1,2-Dimethyl-5-Imidazolecarboxaldehyde-(4'-Ethyl-3'-Thio) Semicarbazone:

Following a procedure identical to Example 2 (above), 19.1 gm. (0.16 mole) of 4-ethyl-3-thiosemicarbazide was reacted with the aldehyde to provide, following crystallization from aqueous ethanol, 24.0 g. (66.2%) of white needles, mp: 196°–197.5°. λ max(nm) = 318 (Am = 38,164) Anal. Calc'd for $C_9H_{16}N_5S$: C, 47.77; H, 7.13; N, 30.94; S, 14.17. Found: C, 48.04; H, 6.92; N, 31.01.

EXAMPLE 4

1,2-Dimethyl-5-Imidazolecarboxaldehyde-(4'-Allyl-3'-Thio) Semicarbazone:

Following a procedure identical to Example 3 (above), 20.8 g. (0.16 mole) of 4-allyl-3-thiosemicarbazide was reacted with the aldehyde to provide following crystallization, 19.5 g. (51.2%) of white needles, mp: 194°–195.5°. λ max(nm) = 316–318 (Am = 38,460) Anal. Calc'd for $C_{10}H_{16}N_5S$: C, 50.39; H, 6.77; N, 29.39; S, 13.46. Found: C, 50.55; H, 6.69; N, 29.52.

EXAMPLE 5

1,2-Dimethyl-5-Imidazolecarboxaldehyde-(4'-Phenyl-3'-Thio) Semicarbazone:

Following a procedure identical to Example 1 (above), 27.2 g. (0.16 mole) of 4-phenyl-3-thiosemicarbazide was condensed with the aldehyde to provide, following crystallization from water, 35.4 g. (80.5%) of the product as white microneedles, mp: 201.5°–203.5°. λ max(nm) = 326 (Am = 41,480). Anal. Calc'd for $C_{13}H_{16}N_5S$: C, 56.91; H, 5.88; N, 25.53; S, 11.69. Found: C, 57.09; H, 5.89; N, 25.50.

EXAMPLE 6

1,2-Dimethyl-5-Imidazolecarboxaldehyde Semicarbazone:

Following a procedure similar to Example 1 (above), 17.9 g. (0.16 mole) of semicarbazide hydrochloride (Pflatz and Bauer) was condensed with 0.16 mole of the aldehyde in the presence of 0.16 moles of sodium hydroxide. The thick white precipitate was collected and crystallized from absolute ethanol to provide 15.3 gm. (48.0%) of the product as the hydrate, mp: 209°–211°. $\lambda_{max}$EtOH(nm) = 291 (Am = 23,750) Anal. Calc'd for $C_7H_{13}N_5O_2$: C, 42.20; H, 6.58; N, 35.15; O, 16.06. Found: C, 42.48; H, 6.49; N, 35.35.

EXAMPLE 7

1,2-Dimethyl-5-Imidazole (4'-Phenyl)semicarbazone:

By a similar procedure, 24.2 g. (0.16 mole) of 4-phenylsemicarbazide (Chemical Procurement Laboratories) was reacted with 0.16 mole of the aldehyde to provide, following crystallization twice from ethanol, 26.2% of product, mp: 199°–201°. $\lambda_{max}$EtOH(nm) = 298 (Am = 28,650) Anal. Calc'd for $C_{13}H_{15}N_5O$: C, 60.68; H, 5.88; N, 27.21; O, 6.22. Found: C, 60.91; H, 5.92; N, 27.19.

Acute oral toxicities of several 1,2-dimethyl-5-imidazolecarboxaldehyde thio-semicarbazones were determined in mice. After administering dosage levels of 1,000 mg/kg and 2,000 mg/kg to groups of five mice each, the results during a twenty-one day test period were as follows:

| Compound | 1000 mg/kg (deaths/subjects) | 2000 mg/kg (deaths/subjects) |
|---|---|---|
| 1,2-Dimethyl-5-imidazolecarboxaldehyde thiosemicarbazone | 1/5 | 2/3 |
| 1,2-Dimethyl-5-imidazolecarboxaldehyde (4'-Methyl-3'-thio)semicarbazone | 0/5 | 2/3 |
| 1,2-Dimethyl-5-imidazolecarboxaldehyde (4'-Ethyl-3'-thio)semicarbazone | 0/5 | 1/3 |
| 1,2-Dimethyl-5-imidazolecarboxaldehyde (4'-Allyl-3'-thio)semicarbazone | 0/5 | 0/3 |
| 1,2-Dimethyl-5-imidazolecarboxaldehyde (4'-Phenyl-3'-thio)semicarbazone | 0/5 | 0/3 |

From the above toxicity data, it is apparent that 1,2-dimethyl-5-imidazolecarboxaldehyde thiosemicarbazones are relatively non-toxic.

Irritation tests were carried out by occluding on freshly shaved rabbit skin a one centimeter square gauze patch upon which was added 0.5 c.c. of a 5% solution or suspension of the particular compound in a 60–40 ethanol-water mixture. The duration of the test was twenty-four hours. The rating scale was 0-4 for both edema and erythema. The results of the tests were as follows:

| Compound | Edema | Erythema |
|---|---|---|
| 1,2-Dimethyl-5-imidazolecarboxaldehyde thiosemicarbazone | 0 | 0 |
| 1,2-Dimethyl-5-imidazolecarboxaldehyde (4'-methyl-3'-thio)-semicarbazone | 0 | 0 |
| 1,2-Dimethyl-5-imidazolecarboxaldehyde (4'-ethyl-3'-thio)-semicarbazone | 0 | 0 |
| 1,2-Dimethyl-5-imidazolecarboxaldehyde (4'-allyl-3'-thio)-semicarbazone | 0 | 0 |
| 1,2-Dimethyl-5-imidazolecarboxaldehyde (4'-phenyl-3'-thio)-semicarbazone | 0 | 0 |

The results of the above tests indicate the 1,2-dimethyl-5-imidazolecarboxaldehyde thiosemicarbazones are not irritating.

Five percent solutions of various sunscreening agents as defined herein were prepared in inert solvents. The solutions were applied to filter paper and the solvent evaporated. The filter paper was then exposed to sunlight continuously for four hours. The results were graded on a 0–10 scale as a function of darkening or color change of a particular sunscreen with 0 = no darkening and 10 = severe darkening. 4-Aminobenzoic Acid is a known sunscreen agent.

| Compound | Reading |
|---|---|
| 4-Aminobenzoic Acid | 8 |
| 1,2-Dimethylimidazole-5-carboxaldehyde Thiosemicarbazone | 8 |
| 1,2-Dimethylimidazole-5-carboxaldehyde (4'-Methyl-3'-Thio)semicarbazone | 3 |
| 1,2-Dimethylimidazole-5-carboxaldehyde (4'-Ethyl-3'-Thio)semicarbazone | 3 |
| 1,2-Dimethylimidazole-5-carboxaldehyde (4'-Allyl-3'-Thio)semicarbazone | 3 |
| 1,2-Dimethylimidazole-5-carboxaldehyde (4'-Phenyl-3'-Thio)semicarbazone | 3 |
| 1,2-Dimethylimidazole-5-carboxaldehyde semicarbazone | 1 |
| 1,2-Dimethylimidazole-5-carboxaldehyde (4'-Phenyl)carbazone | 3 |

The results indicate that as a class, these compounds exhibit generally lessened staining than 4-aminobenzoic acid when subjected to sunlight.

The 1,2-dimethyl-5-imidazolecarboxaldehyde thiosemicarbazones can be formulated into cosmetically acceptable sunscreening preparations. The following examples are representative of such preparations.

| Formulation No. 1 | The following formulation provides a hydro-alcoholic sunscreen preparation: |
|---|---|
| % | Component |
| 32.86 | Demineralized Water |
| 0.14 | Hydroxypropyl Cellulose |
| 55.00 | 95% Ethanol |
| 2.00 | Polyethoxylated Cholesterol |
| 5.00 | 1,2-Dimethyl-5-imidazolecarboxaldehyde (4'-ethyl-3'-thio)semicarbazone |
| 5.00 | Glycerine |
| 100.00 | |

| Formulation No. 2 | The following formulation provides a sunscreen preparation as a clear gel: |
|---|---|
| % | Component |
| 57.50 | 95% Ethanol |
| 4.00 | Polyoxethylene lauryl ether |
| 32.40 | Demineralized Water |
| 2.00 | Carboxyvinyl copolymer |
| 0.05 | D & C Yellow No. 10 Solution (1.0%) |
| 0.05 | FD & C Brille Blue No. 1 Solution (1.0%) |
| 0.50 | Ethoxylated polypropylene glycols |
| 2.50 | 1,2-Dimethyl-5-imidazolecarboxaldehyde (4'-ethyl-3'-thio)semicarbazone |
| 1.00 | Diisopropanolamine |

What is claimed:
1. Compounds having the formula

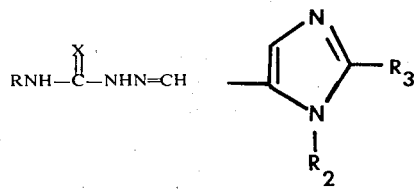

where R is hydrogen, alkyl, alkenyl, or aryl; X is sulfur; and $R_2$ and $R_3$ are methyl.

2. Compounds as defined in claim 1, wherein R is selected from the group consisting of hydrogen, methyl, ethyl, allyl and phenyl; and $R_2$ and $R_3$ are both methyl.

3. The compound of claim 1 which is 1,2-dimethyl-5-imidazolecarboxaldehyde thiosemicarbazone.

4. The compound of claim 1 which is 1,2-dimethyl-5-imidazolecarboxaldehyde (4'-ethyl-3'-thio)semicarbazone.

5. The compound of claim 1 which is 1,2-dimethyl-5-imidazolecarboxaldehyde (4'-ethyl-3'-thio)semicarbazone.

6. The compound of claim 1 which is 1,2-dimethyl-5-imidazolecarboxaldehyde (4'-allyl-3'-thio)semicarbazone.

7. The compound of claim 1 which is 1,2-dimethyl-5-imidazolecarboxaldehyde (4'-phenyl-3'-thio)semicarbazone.

8. A process for protecting light-sensitive subjects against ultraviolet radiation which comprises filtering such radiation by means of a radiation-absorbing amount of a sunscreen agent as defined in claim 1.

* * * * *